United States Patent
Tehrani (10) Patent No.: US 12,140,970 B2
(45) Date of Patent: Nov. 12, 2024

(54) MULTIVARIABLE AIRSPEED AND FLIGHT PATH ANGLE CONTROL OF A CO-AXIAL ROTARY WING AIRCRAFT WITH A PUSHER-PROPELLER

(71) Applicant: Lockheed Martin Corporation, Bethesda, MD (US)

(72) Inventor: Navid Dadkhah Tehrani, Providence, RI (US)

(73) Assignee: Lockheed Martin Corporation, Bethesda, MD (US)

(*) Notice: Subject to any disclaimer, the term of this patent is extended or adjusted under 35 U.S.C. 154(b) by 168 days.

(21) Appl. No.: 17/344,171

(22) Filed: Jun. 10, 2021

(65) Prior Publication Data

US 2022/0397916 A1   Dec. 15, 2022

(51) Int. Cl.

| | |
|---|---|
| G05D 1/00 | (2024.01) |
| B64C 11/00 | (2006.01) |
| B64C 27/10 | (2023.01) |
| B64C 27/82 | (2006.01) |
| B64D 31/02 | (2006.01) |

(Continued)

(52) U.S. Cl.
CPC ............ *G05D 1/101* (2013.01); *B64C 11/00* (2013.01); *B64C 27/10* (2013.01); *B64C 27/82* (2013.01); *B64D 31/02* (2013.01); *B64D 31/06* (2013.01); *G08G 5/0047* (2013.01); *B64C 2027/8236* (2013.01)

(58) Field of Classification Search
CPC ............ B64C 27/82; B64C 2027/8236; B64C 2027/8209–829; B64C 27/00; G05D 1/00; G05D 1/101–108; G05D 1/0202–0204; G05D 1/042–046; G05D 1/0607–0688; G05D 1/0808–0866
USPC ...................................... 701/2–18
See application file for complete search history.

(56) References Cited

U.S. PATENT DOCUMENTS

| | | |
|---|---|---|
| 6,691,950 B2 | 2/2004 | Salesse-Lavergne |
| 10,747,235 B2 | 8/2020 | Irwin, III et al. |
| (Continued) | | |

OTHER PUBLICATIONS

Cohen, Raphael & Miculescu, David & Reilley, Kevin & Pakmehr, Mehrdad & Feron, Eric. (2013). Online Performance Optimization of a DC Motor Driving a Variable Pitch Propeller. (Year: 2013).*

(Continued)

*Primary Examiner* — Rami Khatib
*Assistant Examiner* — Paul Allen
(74) *Attorney, Agent, or Firm* — Michael Best & Friedrich LLP (57) ABSTRACT

Systems and methods for controlling a coaxial rotary-wing aircraft including a co-axial main rotor assembly and a pusher-propeller. One system includes an electronic controller configured to receive a reference velocity of the aircraft and receive a reference flight path angle of the aircraft. The electronic controller is also configured to simultaneously control the co-axial main rotor assembly and the pusher-propeller based on the reference velocity of the aircraft and the reference flight path angle of the aircraft, by simultaneously generating a commanded thrust of the pusher-propeller and a commanded thrust of the co-axial main rotor assembly using a multiple input, multiple output algorithm applying dynamic inversion.

20 Claims, 4 Drawing Sheets

(51) Int. Cl.
  *B64D 31/06* (2024.01)
  *G08G 5/00* (2006.01)

(56) References Cited

U.S. PATENT DOCUMENTS

| | | | | |
|---|---|---|---|---|
| 2008/0237392 | A1* | 10/2008 | Piasecki | B64C 27/82 |
| | | | | 244/6 |
| 2019/0332126 | A1* | 10/2019 | Irwin, III | B64C 27/52 |
| 2021/0316874 | A1* | 10/2021 | Resnick | B60L 3/0023 |
| 2022/0350347 | A1* | 11/2022 | Hagerott | G05D 1/0825 |

OTHER PUBLICATIONS

Berger, Tom & Tischler, Mark & Horn, Joseph. (2020). Outer-Loop Control Design and Simulation Handling Qualities Assessment for a Coaxial-Compound Helicopter and Tiltrotor. (Year: 2020).*

Iyer, Venkatakrishnan V. (2020) Nonlinear Yaw Control of a Compound Helicopter (Year: 2020).*

Berger, Tom & Tischler, Mark & Horn, Joseph. (2021). High-Speed Rotorcraft Pitch Axis Response Type Investigation (Year: 2021).*

M. W. Achtelik, S. Lynen, M. Chli and R. Siegwart, "Inversion based direct position control and trajectory following for micro aerial vehicles," 2013 IEEE/RSJ International Conference on Intelligent Robots and Systems, Tokyo, Japan, 2013, pp. 2933-2939, doi: 10.1109/IROS.2013.6696772. (Year: 2013).*

Lombaerts, Thomas & Kaneshige, John & Schuet, Stefan & Aponso, Bimal & Shish, Kimberlee & Hardy, Gordon. (2020). Dynamic Inversion based Full Envelope Flight Control for an eVTOL Vehicle using a Unified Framework. 10.2514/6.2020-1619. (Year: 2020).*

\* cited by examiner

MULTIVARIABLE AIRSPEED AND FLIGHT PATH ANGLE CONTROL OF A CO-AXIAL ROTARY WING AIRCRAFT WITH A PUSHER-PROPELLER

SUMMARY

There is a coupling between airspeed and climb-rate during longitudinal motion of an aircraft, wherein changes in one flight characteristic impacts the other characteristic. In other words, a change in airspeed indirectly causes a change in climb-rate and vice versa. Single rotary wing aircraft use the main rotor assembly to provide both altitude adjustment and airspeed adjustment. Co-axial rotary wing aircraft with a pusher-propeller, however, can also use the separate pusher-propeller to adjust airspeed. Accordingly, this type of aircraft often includes separate airspeed and climb-rate controllers. In this type of configuration, the aircraft may use the pitch altitude to control airspeed and main rotor thrust to control altitude when traveling at low speeds and may use the pusher-propeller to control air speed and the main rotor thrust to control altitude when traveling at high speeds. This separate single-input, single output control functionality, however, ignores the coupling between air speed and climb-rate, which can impact tight response control needed for many high-speed aircraft maneuvers, such as, for example, terrain masking through Nap-of-the-Earth (NOE) flight (e.g., flight at less than approximately 10 meters above ground level).

Accordingly, embodiments described herein provide a dynamic-inversion based technique to simultaneously control airspeed and climb-rate of a co-axial rotary wing aircraft with a pusher-propeller. The multi-input, multi-output control law can be designed independent of inner-loop dynamics (e.g., as long as sufficient time-scale separation exists between the inner-loop (controlling pitch, roll, and yaw of the aircraft) and the outer-loop (see, e.g., FIG. 2 described below). Simultaneously controlling the airspeed and flight path angle via the dynamic inversion equations described in further detail below by making use of both the pusher-propeller and the main rotor represent a novel control algorithm for an aircraft as compared to traditional approaches where the main rotor and the pusher-propeller separately control altitude and airspeed, respectively.

For example, some embodiments provide, among other things, a system for controlling an aircraft including a co-axial main rotor assembly and a pusher-propeller. The system includes an electronic controller configured to receive a reference velocity of the aircraft and receive a reference flight path angle of the aircraft. The electronic controller is also configured to simultaneously control the co-axial main rotor assembly and the pusher-propeller based on the reference velocity of the aircraft and the reference flight path angle of the aircraft, by simultaneously generating a commanded thrust of the pusher-propeller and a commanded thrust of the co-axial main rotor assembly using a multiple input, multiple output algorithm applying dynamic inversion.

Another embodiment provides a method of controlling an aircraft including a co-axial main rotor assembly and a pusher-propeller. The method includes receiving, with an electronic controller, a reference velocity of the aircraft, and receiving, with the electronic controller, a reference flight path angle of the aircraft. The method further includes simultaneously controlling, with the electronic controller, the co-axial main rotor assembly and the pusher-propeller based on the reference velocity of the aircraft and the reference flight path angle of the aircraft by simultaneously generating a commanded thrust of the pusher-propeller and a commanded thrust of the co-axial main rotor assembly using a multiple input, multiple output algorithm applying dynamic inversion.

A further embodiment provides non-transitory computer readable medium storing instructions, executable by an electronic processor, to perform a set of functions. The set of functions including simultaneously controlling a co-axial main rotor assembly and a pusher-propeller of an aircraft based on a reference velocity of the aircraft and a reference flight path angle of the aircraft using a multiple input, multiple output algorithm applying dynamic inversion. Simultaneously controlling the co-axial main rotor assembly and the pusher-propeller can include applying a reference model to the reference velocity and the reference flight path angle to generate a commanded velocity of the aircraft and a commanded flight path angle of the aircraft, applying desired dynamics to the commanded velocity of the aircraft and the commanded flight path angle of the aircraft to generate a rate of change of a desired velocity of the aircraft and a rate of change of a desired flight path angle of the aircraft, and applying dynamic inversion to the rate of change of the desired velocity of the aircraft and the rate of change of the desired flight path angle of the aircraft to generate a commanded thrust of pusher-propeller and a commanded thrust of the co-axial main rotor assembly.

Other aspects and embodiments will become apparent by consideration of the detailed description and accompanying drawings.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if most of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

It also should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
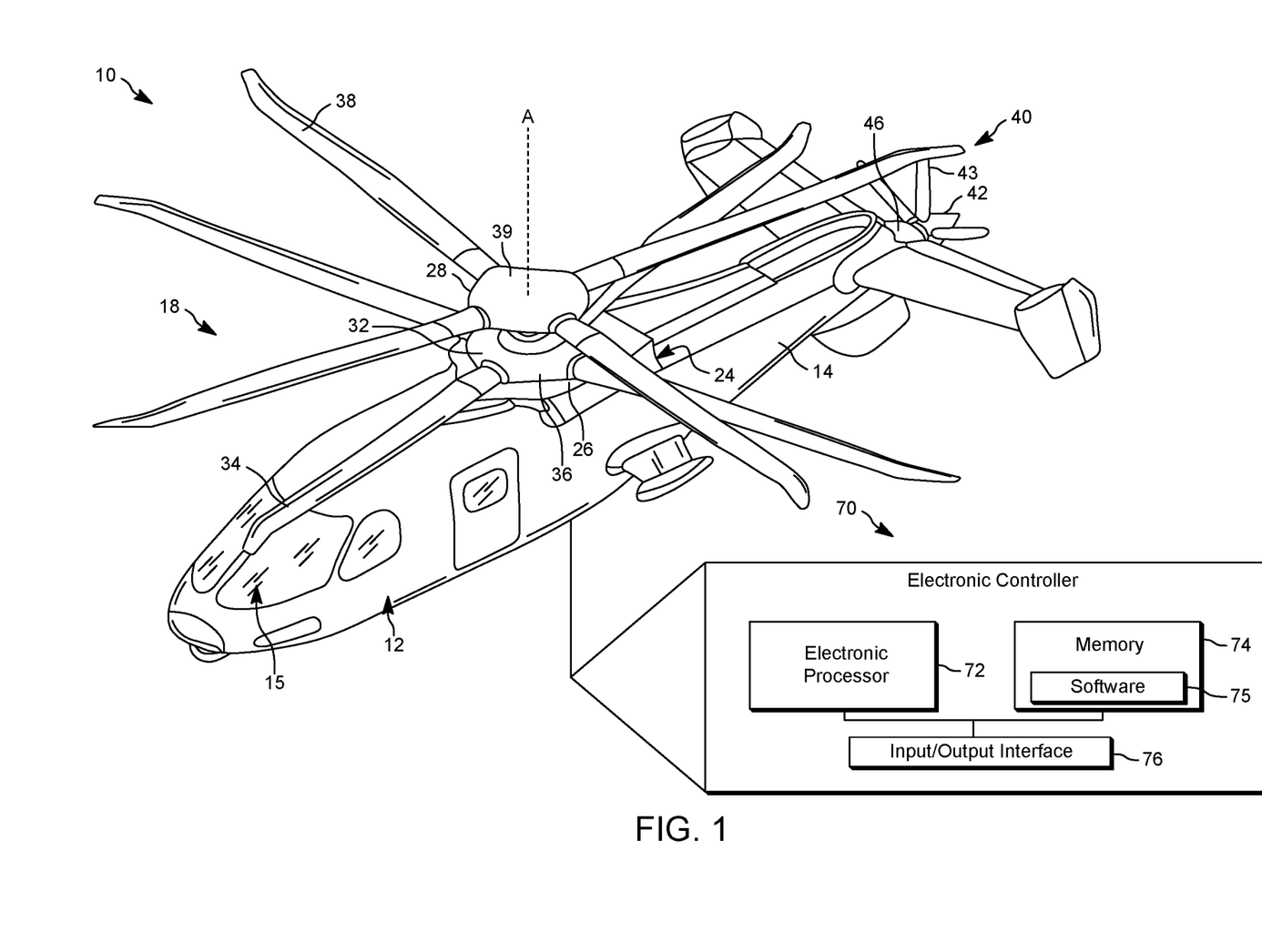
FIG. 1 illustrates a co-axial rotary wing aircraft with a pusher-propeller according to some embodiments.

Referring now to the figures, FIG. 1 illustrates a co-axial rotary wing aircraft 10 according to some embodiments. The aircraft 10 includes an airframe 12 with an extending tail 14. The aircraft 10 includes a dual, counter rotating, co-axial main rotor assembly 18 that rotates about an axis A. The airframe 12 includes a cockpit 15 having one or more seats for flight crew (e.g., pilot and co-pilot) and optional passengers.

The main rotor assembly 18 is driven by a power source, such as, for example, one or more motors 24 via a main rotor gearbox 26. The one or more motors 24 can include an electric motor, a piston engine, a gas turbine, or other device for providing motion.

The main rotor assembly 18 includes an upper rotor assembly 28 driven in a first direction (e.g., counter-clockwise) about the main rotor axis A, and a lower rotor assembly 32 driven in a second direction (e.g., clockwise) about the main rotor axis A, wherein the second direction is opposite to the first direction (i.e., to provide two counter rotating rotors). The upper rotor assembly 28 includes a first plurality of rotor blades 38 supported by a first rotor hub 39. The lower rotor assembly 32 includes a second plurality of rotor blades 34 supported by a second rotor hub 36. As illustrated in FIG. 1, the aircraft 10 further also includes a pusher-propeller 40 located at the extending tail 14 to provide translational thrust (forward or rearward) for the aircraft 10. In some embodiments, the pusher-propeller 40 includes a propeller 42 including a plurality of propeller blades 43. Although FIG. 1 illustrates the propeller 42 in the context of a pusher-propeller configuration, in other embodiments, the propeller 42 may be a puller-propeller. Similarly, in some embodiments, the propeller 42 may be mounted in a static configuration with respect to the aircraft 10 as illustrated in FIG. 1. However, in other embodiments, the propeller 42 has a variable position, which allows the propeller to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

In some embodiments, the pusher-propeller 40 (i.e., the propeller 42) is connected to and driven by the one or more motors 24 via a propeller gearbox 46. In some embodiments, the propeller gearbox 46 is driven by the main rotor gearbox 26, and the propeller gearbox 46 can be configured to change a gear ratio between the main rotor gearbox 26 and the propeller gearbox 46 to vary, on command, the relative speeds between the main rotor gearbox 26 and the propeller gearbox 46. In such embodiments, the variable gear ratio of the propeller gearbox 46 controls power transmitted from the main rotor gearbox 26 to the propeller gearbox 46. Other configurations for controlling the pusher-propeller 40 are possible, such as, for example, using an engine or power source to drive the pusher-propeller 40 that is separate from the engine or power source used to power the main rotary assembly 18.

As also illustrated in FIG. 1 (in an expanded view), the aircraft 10 includes an electronic controller 70. The electronic controller 70 includes a plurality of electrical and electronic components that provide power, operation control, and protection to the components and modules within the electronic controller 70. The electronic controller 70 can includes an electronic processor 72 (such as a programmable electronic microprocessor or similar device) that executes software to control operation of the main rotor assembly 18 and the pusher-propeller 40. In the example illustrated in FIG. 1, the electronic controller 70 also includes memory 74 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 76.

The electronic processor 72 is communicatively connected to the memory 74 and the input-output interface 76. In some embodiments, the memory 74 stores software 75 executable by the electronic processor 72 to perform the control functionality and associated methods described herein. It should be understood that the electronic controller 70 can include other components, and the configuration illustrated in FIG. 1 is provided as one example. For example, in some embodiments, the electronic controller 70 includes one or more for example, microprocessors, digital signal processors, customized processors and field programmable gate arrays (FPGAs) and unique stored program instructions (including both software and firmware) that control the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

In some embodiments, the aircraft 10 also includes a plurality of sensors (not shown). Each sensor generates a signal representing a measured operating characteristic of the aircraft 10 (e.g., altitude, airspeed, etc.) and transmits the signal to the electronic controller 70 (directly or indirectly). The electronic controller 70 receives such signals via the input-output interface 76 and these signals can be used as part of the control functionality performed by the electronic processor 72 (through execution of the software 75). These received signals (or data derived therefrom) can also be stored in the memory 74.

Figure 2:
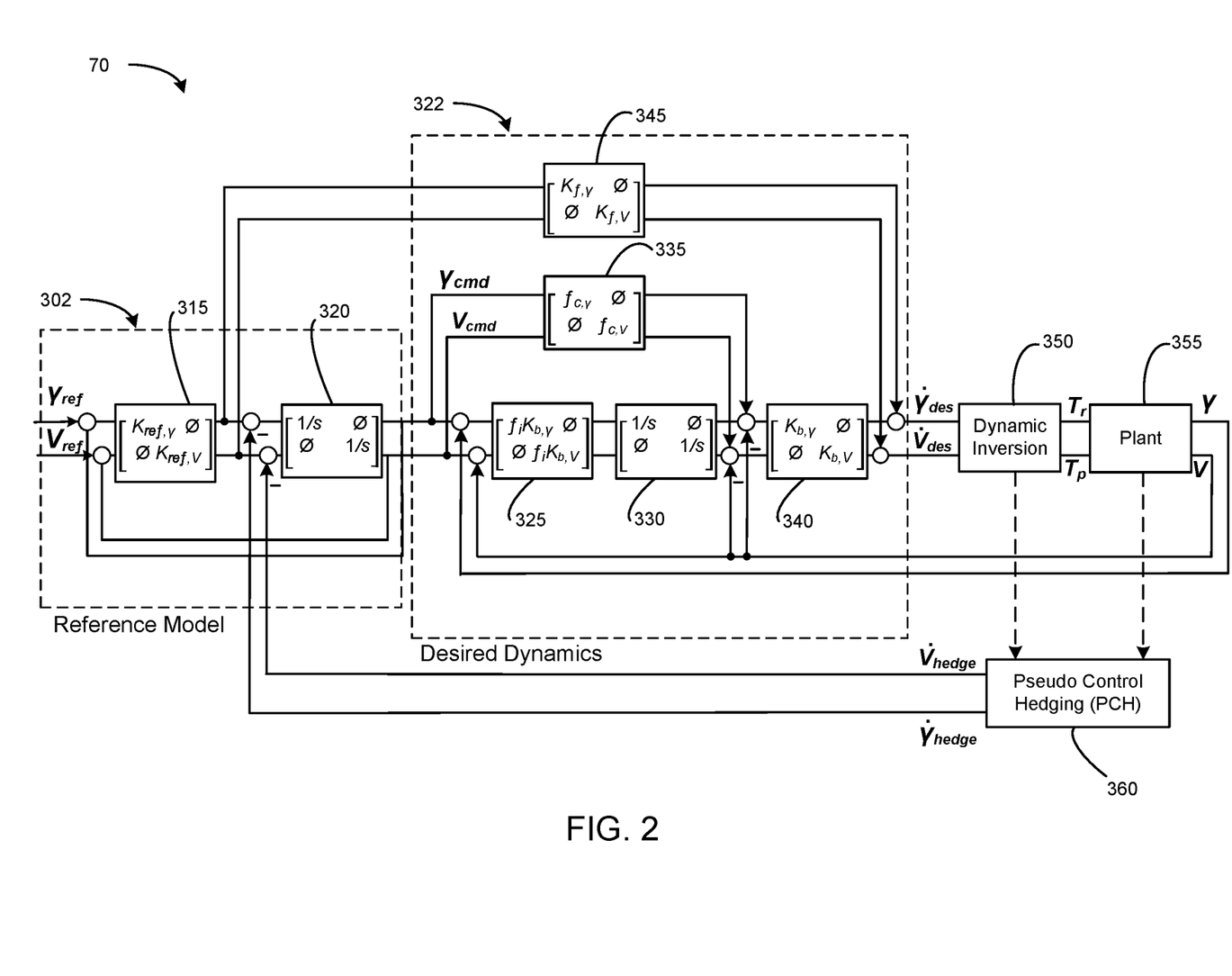
FIG. 2 is a block diagram of a control system included in the co-axial rotary wing aircraft of FIG. 1 according to some embodiments.

FIG. 2 is a block diagram illustrating the electronic controller 70. In particular, FIG. 2 schematically illustrates modules included in the electronic controller 70 and associated functionality performed by the electronic controller 70 to provide airspeed and flight path angle control as described herein. As illustrated in FIG. 2, the electronic controller 70 receives a reference airspeed $V_{ref}$ and a reference flight path angle $\gamma_{ref}$, which represent a requested airspeed and a requested flight path angle (e.g., as received from a pilot-controlled input device, an auto-pilot system, or a combination thereof). As illustrated in FIG. 2, these reference values pass through a first order reference model module 302 (described below), which outputs a commanded airspeed $V_{cmd}$ and a commanded flight path angle $\gamma_{cmd}$. These commanded control variables are compared to measured variables and pass through the desired dynamics (with integral action) module 322 (described below). In some embodiments, one or more feedforward paths exist within the control logic, which allows a designer to achieve a desired response shape. The output of the desired dynamics module 322 is a rate of change of the desired controlled variables (i.e., $\dot{\gamma}_{des}$ and $\dot{V}_{des}$). Applying dynamic inversion to these rate of change values via a dynamic inversion module 350 (described below), generates commanded main rotor thrust $T_r$, and commanded pusher-propeller thrust $T_p$, which are passed to plant 355 (e.g., one more actuators or other control mechanisms for the main rotor assembly 18 and the pusher-propeller 40) for execution. As also illustrated in FIG. 2, the electronic controller 70 can be configured to apply pseudo control hedging (PCH) via a PCH module 360 (described below) to slow down the reference model module 302 in the case of actuator saturation. Details regarding PCH can also be found in "*Pseudo-Control Hedging: A New Method For Adaptive Control*," Eric Johnson and Anthony Calise, Advances in Navigation Guidance and Control Technology Workshop, Nov. 1-2, 2000, Redstone Arsenal, Alabama.

Figure 3:
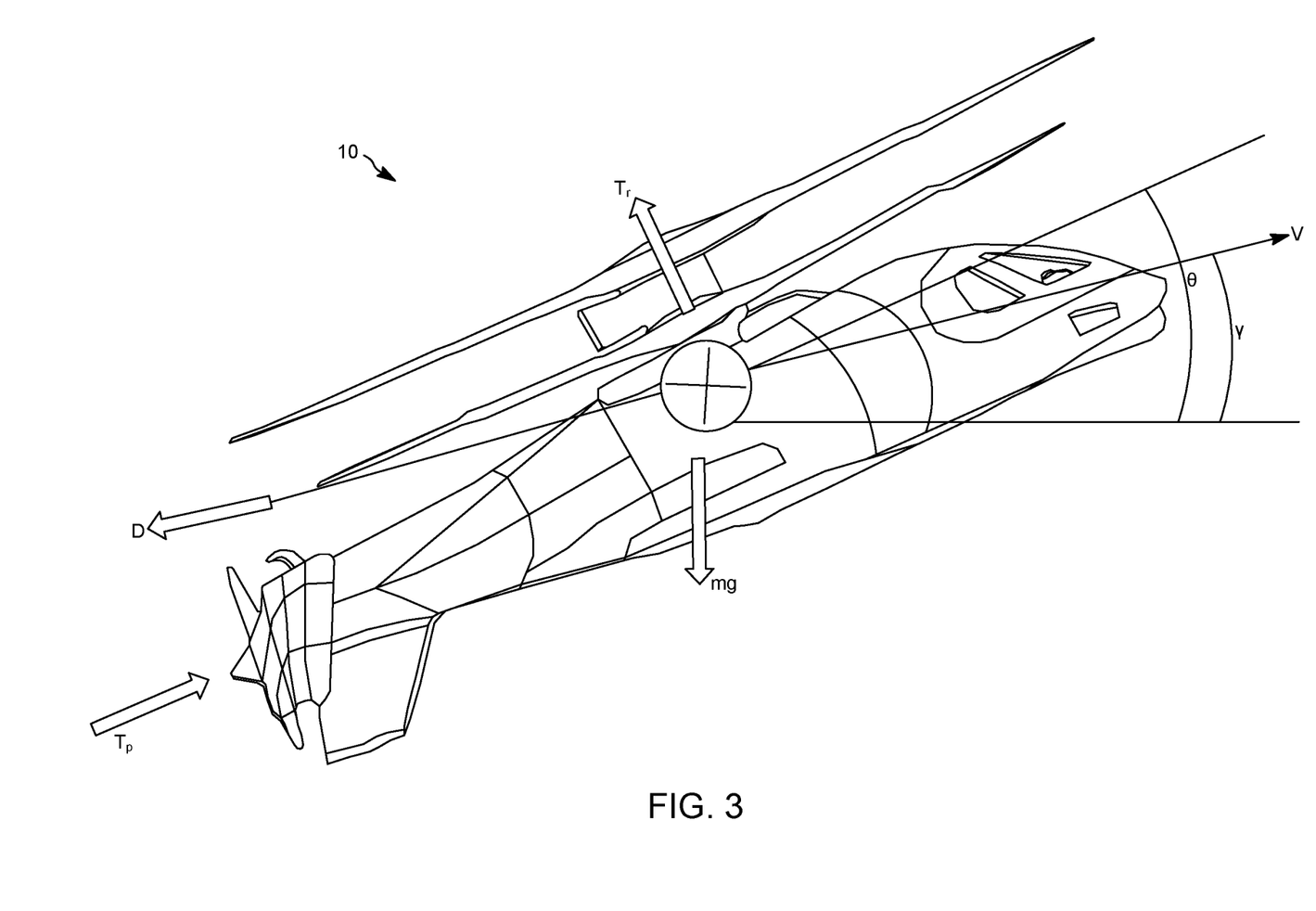
FIG. 3 illustrates flight path dynamics of the co-axial rotary wing aircraft of FIG. 1 according to some embodiments.

As noted above, the electronic controller 70 applies a multivariate (i.e., multi-input, multi-output) control law to simultaneously control airspeed (i.e. velocity) and climb-rate (i.e., flight path angle) of the aircraft 10. This control law is developed using flight path dynamics. For example, the dynamics of the flight path using a point mass model of the aircraft 10 can be expressed as Equations (1), (2), and (3):

$$\dot{V} = \frac{T_p \cos(\theta-\gamma) - T_r \sin(\theta-\gamma) - D}{m} - g \sin\gamma \quad (1)$$

$$\dot{\chi} = \frac{T_p \sin(\theta-\gamma) + T_r \cos(\theta-\gamma)}{mV \cos\gamma} \sin\mu \quad (2)$$

$$\dot{\gamma} = \frac{T_p \sin(\theta-\gamma) + T_r \cos(\theta-\gamma)}{mV} \cos\mu - \frac{g}{V} \cos\gamma \quad (3)$$

Where V is the airspeed, $\chi$ is the course angle (defined in degrees from north), $\gamma$ is the flight path angle, $\theta$ is the pitch angle, $\mu$ is the aerodynamic roll angle, D is the drag force, g is gravity, and m is the mass of the aircraft 10. $T_p$ is the pusher-propeller thrust and $T_r$ is the main rotor thrust as illustrated in FIG. 3.

Variables $T_x$ and $T_z$ can be defined in Equations (4) and (5) below to simplify the above equations:

$$T_x = T_p \cos(\theta-\gamma) - T_r \sin(\theta-\gamma) \quad (4)$$

$$T_z = T_p \sin(\theta-\gamma) + T_r \cos(\theta-\gamma) \quad (5)$$

In particular, Equations (4) and (5) allow Equations (1), (2), and (3) to be written as Equations (6), (7), and (8) below:

$$\dot{V} = \frac{T_x - D}{m} - g \sin\gamma \quad (6)$$

$$\dot{\chi} = \frac{T_z}{mV\cos\gamma} \sin\mu \quad (7)$$

$$\dot{\gamma} = \frac{T_z}{mV} \cos\mu - \frac{g}{V} \cos\gamma \quad (8)$$

Under the assumption that time-scale separation exists between the path dynamics and the roll and pitch inner-loop dynamics, Equations (6), (7), and (8) illustrate that velocity and flight path angle dynamics are highly coupled. Accordingly, as described below, the electronic controller 70 uses this coupling to provide a multivariate control law for the aircraft 10.

For example, the electronic controller 70, as part of the dynamic inversion module 350, determines a thrust of main rotor assembly 18 and a thrust of the pusher-propeller 40 by inverting the path dynamics equations. In particular, $T_z$ (Equation 9) can be obtained by inverting Equations (7) and (16) (defined below):

$$T_z = mV\sqrt{\left(\dot{\gamma}_{des} + \frac{g}{V}\cos\gamma\right)^2 + \left(\dot{\chi}_{des} + \frac{g}{V}\cos\gamma\right)^2} \quad (9)$$

Similarly, $T_x$ (Equation 10) can be obtained by inverting Equation (6):

$$T_x = m(\dot{V}_{des} + g \sin\gamma) \quad (10)$$

Drag force has been omitted from the above dynamic inversion. Aerodynamic drag is typically difficult to model. Thus, drag has been treated as a disturbance force and, for this simplification, the drag disturbance force is removed by the electronic controller 70 via an augmented integrator described below with respect to the desired dynamics module 322.

After $T_x$ and $T_z$ are determined by the electronic processor 72, the electronic processor 72 determines a thrust $T_r$ of the main rotor assembly 18 and a thrust $T_p$ of the pusher-propeller 40 (Equation 11) using an inverse of Equation (5):

$$\begin{bmatrix} T_p \\ T_r \end{bmatrix} = \begin{bmatrix} \cos(\theta-\gamma) & \sin(\theta-\gamma) \\ \sin(\theta-\gamma) & \cos(\theta-\gamma) \end{bmatrix} \begin{bmatrix} T_x \\ T_z \end{bmatrix} \quad (11)$$

To obtain the desired variables $\dot{V}_{des}$ and $\dot{\gamma}_{des}$ via the desired dynamics module 322 (see FIG. 2) from the reference model 302, which is the input into the dynamic inversion module 350, the electronic controller 70 uses the below Equations (12) and (13). In particular, consider y as a controlled variable and its rate of change as $\dot{y}$. The variable $y_{ref}$ can be defined as the commanded or reference value for $\dot{y}$. The desired dynamics for y with integral compensation can thus be given by the following Equations (12) and (13):

$$\dot{y}_{des} = K_f \dot{y}_{ref} + K_b (f_c y_{ref} - y + z) \quad (12)$$

$$\dot{z} = f_i K_b (y_{ref} - y) \quad (13)$$

Where $K_f$ is feedforward gain, $K_b$ is feedback gain or bandwidth gain, $f_c$ is command gain, and $f_i$ is integral gain.

To obtain the commanded values $V_{cmd}$ and $\gamma_{cmd}$ via the reference model module 302, which is the input into the desired dynamics module 322, the electronic controller 70 uses a reference model. Since the path dynamics have a relative degree of one, the electronic controller 70 uses a first order reference model. Assuming $y_{cmd}$ the commanded signal, the reference model dynamics applied by the electronic controller 70 is defined by Equation (14) below:

$$\dot{y}K_{ref}(y_{cmd}-y_{ref})-v_h \quad (14)$$

Where $v_h$ is a hedge signal described below and $K_{ref}$ is the reference model bandwidth.

With respect to the PCH module 360, PCH is used in adaptive control systems to slow down or speed up the reference model in case of input saturation. PCH can also be viewed as an anti-wind up mechanism that, instead of reducing the integrator gain, attempts to slow down the reference model in case of actuator saturation. In other words, PCH can be described conceptually as moving the reference mode backward (hedging) by an estimate of the amount the plant 355 did not move due to a saturated or rate-limited actuator. The hedge signal $v_h$ used in Equation (14) above slows down the first order reference model to the expected reaction deficit.

The equations for the hedge signals $v_h$ for flight path angle and velocity may be derived as shown below. It is to be noted that the main rotor thrust and pusher-propeller thrust is a known value which is measured, for example, directly via a sensor or obtained via a look-up table (e.g., stored by the memory 74) that relates collective and pedal commands to thrust. For example, the hedge signal for flight path angle is given by Equation (15):

$$\dot{\gamma}_{hedge}=\dot{\gamma}_{meas}-\hat{\dot{\gamma}} \quad (15)$$

Where $\dot{\gamma}_{meas}$ is the measured or estimated $\dot{\gamma}$. Given the measured $T_z$ (i.e., $T_{z,meas}$) the expected value for $\dot{\gamma}$ (i.e., $\hat{\dot{\gamma}}$) based on the model is given by Equation (16):

$$\hat{\dot{\gamma}} = \frac{T_{z,meas}}{mV}\cos\mu - \frac{g}{V}\cos\gamma \quad (16)$$

Similarly, the hedge signal for velocity is set forth below by Equation (17):

$$\dot{V}_{hedge}=\dot{V}_{meas}-\hat{\dot{V}} \quad (17)$$

Where $\dot{V}_{meas}$ is a measured or estimated $\dot{V}$. Given the measured $T_x$ (i.e., $T_{x,meas}$), the expected value for $\dot{V}$ (i.e., $\hat{\dot{V}}$) based on the model is given by Equation (18):

$$\hat{\dot{V}} = \frac{T_{x,meas}}{m} - g\sin\gamma \quad (18)$$

Accordingly, using the above control logic and the configuration illustrated in FIG. 2, during operation, the electronic controller 70 receives a flight path angle reference value $\gamma_{ref}$ and a velocity reference value $V_{ref}$. These values are respectively multiplied by a flight path angle gain reference value $K_{ref,\gamma}$ and a velocity gain reference value $K_{ref,V}$ (at 315). The generated values (at 315) are integrated and are output as a flight path angle commanded signal $\gamma_{cmd}$ and a velocity commanded signal $V_{cmd}$ (at 320). In some embodiments, before the integration, PCH hedging is performed (i.e., the PCH signal is subtracted), as discussed below with respect to the PCH module 360.

The flight path angle commanded signal $\gamma_{cmd}$ and the velocity commanded signal $V_{cmd}$ are received as input to the desired dynamics module 322, where the flight path angle commanded signal $\gamma_{cmd}$ (i.e., the error signal) is multiplied by $f_i K_{b,\gamma}$ and the velocity commanded signal $V_{cmd}$ is multiplied by $f_i K_{b,V}$ as described above with respect to Equations (12) and (13) (at 325). The result of this multiplication (at 325) is integrated (at 330). As illustrated in FIG. 2, the flight path angle commanded signal $\gamma_{cmd}$ is also multiplied by $f_{c,\gamma}$ and the velocity commanded signal $V_{cmd}$ is also multiplied by $f_{c,V}$ (at 335) as described above with respect to Equations (12) and (13). The generated values (at 330 and 335) are multiplied by $K_{b,\gamma}$ and $K_{b,V}$ respectively (at 340).

As also illustrated in FIG. 2, within the desired dynamics module 322, values generated by the reference model module 302 (at 315) are multiplied by $K_{f,\gamma}$ and $K_{f,V}$ (at 345) and these generated values along with the values generated at 340 are used to generate the desired flight path angle $\dot{\gamma}_{des}$ and a desired velocity $\dot{V}_{des}$ in accordance with Equations (12) and (13) described above. Accordingly, the reference model module 302 and the desired dynamics module 322 contribute to the generation of the desired flight path angle $\dot{\gamma}_{des}$ and a desired velocity $\dot{V}_{des}$ At the dynamic inversion module 350, dynamic inversion is performed on the desired flight path angle $\dot{\gamma}_{des}$ and a desired velocity $\dot{V}_{des}$. As described above with respect to Equations (9), (10), and (11), the dynamic inversion module 350 generates a commanded thrust $T_r$ of the main rotor assembly 18 and a commanded thrust $T_p$ of the pusher-propeller 40.

As illustrated in FIG. 2, the plant 355 receives the commanded thrust $T_r$ of main rotor assembly 18 and the commanded thrust $T_p$ of the pusher-propeller 40 generated via the dynamic inversion module 350 and generates one or more instructions for controlling operation of the main rotor assembly 18 and the pusher-propeller 40 (e.g., by varying a speed ratio between the main rotor gearbox 26 and the propeller gearbox 46). In other words, the plant 355 executes the commanded thrust values generated by the dynamic inversion module 350.

In some embodiments, the actual thrust of the main rotor assembly 18, the actual thrust of the pusher-propeller 40, the actual flight path angle $\gamma$, the actual velocity V of the aircraft 10, or a combination thereof is measured at various points within the processing illustrated in FIG. 2, such as, for example, after the plant 355 receives and executes the commanded thrusts $T_r$ and $T_p$. These measurements can be used as feedback by the electronic controller 70 for use during subsequent cycles of the airspeed and climb-rate control illustrated in FIG. 2, such as, for example, within the desired dynamics module 322 at 325 and 340 (creating, in effect, a proportional integral (PI) controller within the desired dynamics module 322 based on errors determined based on sensed values by the plant 355). As also illustrated in FIG. 2, in some embodiments, output from the dynamic inversion module 350, the plant 355, or both is provided to the PCH module 360 for use in slowing down or speeding up the reference model module 302 in case of input saturation of the flight path angle reference value $\gamma_{ref}$, the velocity reference value $V_{ref}$, or both in accordance with Equations (15), (16), (17), and (18) described above.

Figure 4:
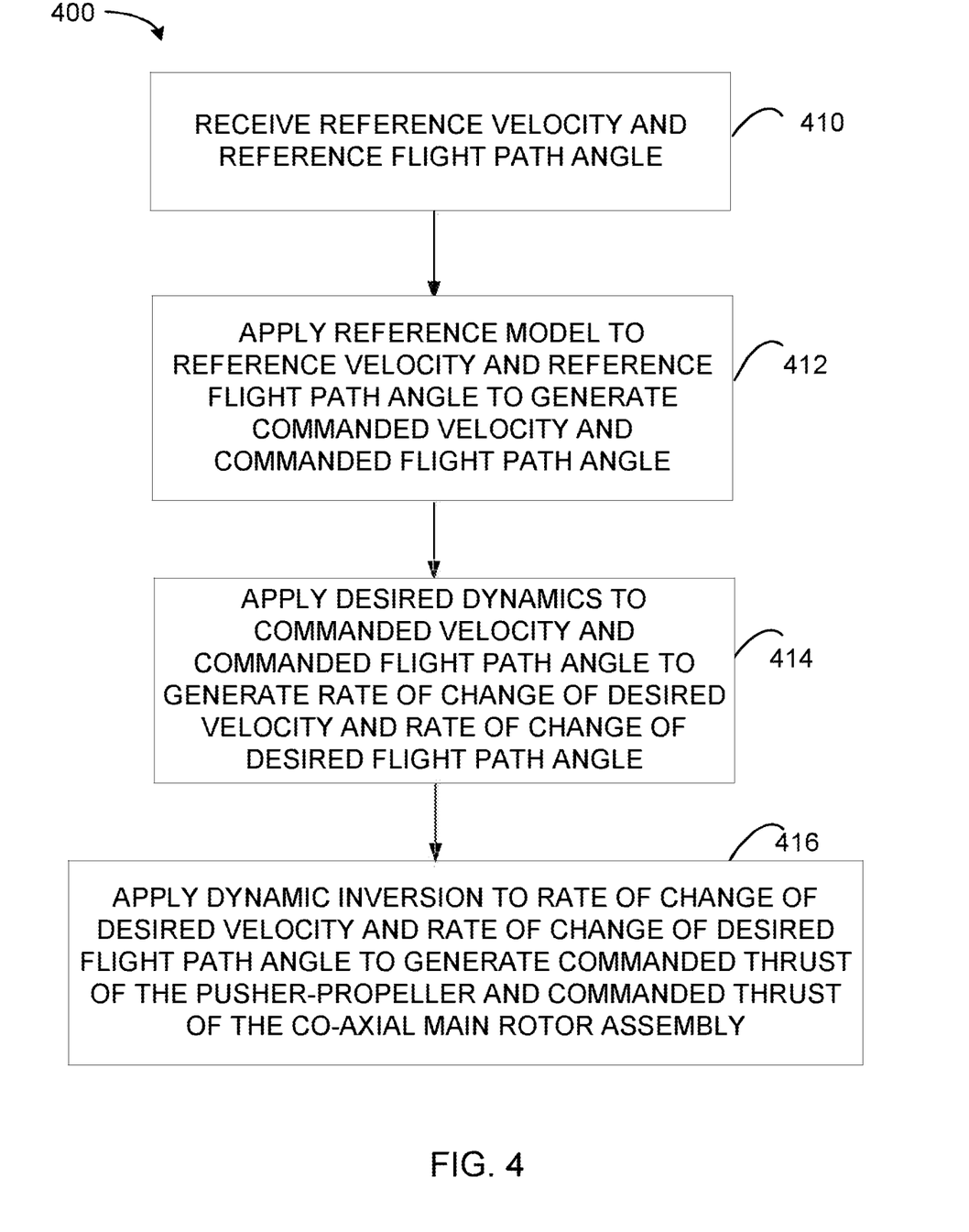
FIG. 4 is a flowchart illustrating a method for controlling the co-axial rotary wing aircraft of FIG. 1 using the control system of FIG. 2 according to some embodiments.

FIG. 4 is a flowchart illustrating a method 400 of controlling the co-axial rotary wing aircraft 10 performed via the electronic controller 70 as described above with respect to FIG. 2. As illustrated in FIG. 4, the method includes receiving a reference velocity $V_{ref}$ of the aircraft 10 and a reference flight path angle $\gamma_{ref}$ of the aircraft 10 (at block 410). As noted above, the reference airspeed $V_{ref}$ and the reference flight path angle $\gamma_{ref}$ can represent a requested airspeed and a requested flight path angle (e.g., as received from a pilot-controlled input device, an auto-pilot system, or a combination thereof).

The electronic controller 70 uses the received reference velocity $V_{ref}$ and the reference flight path angle $\gamma_{ref}$ to simultaneously control the co-axial main rotor assembly 18 and the pusher-propeller 40 by generating a commanded thrust $T_p$ of the pusher-propeller 40 and a commanded thrust $T_r$ of the co-axial main rotor assembly 18 using a multiple input, multiple output algorithm applying dynamic inversion. As described above and illustrated in FIG. 4, performing such simultaneous control can include applying a reference model to the reference velocity $V_{ref}$ and the reference flight path angle $\gamma_{ref}$ to generate a commanded velocity $V_{cmd}$ of the aircraft 10 and a commanded flight path angle $\gamma_{cmd}$ of the aircraft (at block 412), applying desired dynamics to the commanded velocity $V_{cmd}$ of the aircraft 10 and the commanded flight path angle $\gamma_{cmd}$ of the aircraft 10 to generate a rate of change of a desired velocity $\dot{V}_{des}$ of the aircraft 10 and a rate of change of a desired flight path angle $\dot{\gamma}_{des}$ of the aircraft 10 (at block 414), and applying dynamic inversion to the rate of change of a desired velocity $\dot{V}_{des}$ of the aircraft 10 and the rate of change of a desired flight path angle $\dot{\gamma}_{des}$ of the aircraft 10 to generate the commanded thrust $T_p$ of pusher-propeller 40 and the commanded thrust $T_r$ of the co-axial main rotor assembly 18 (at block 416).

As described above, the reference model can include a first order reference model and applying the reference model to the reference velocity and the reference flight path angle can includes applying the reference model based on a hedge signal (e.g., a hedge signal for velocity and a hedge signal for flight path angle). As also described above, the hedge signal can be generated based on a measured thrust of the co-axial main rotor assembly 18 and a measured thrust of the pusher-propeller 40, wherein the measured thrusts can be directly measured or generated via a one or more look-up tables. As also described above, the hedge signal can slow down the reference model in case of actuator saturation. As also described above with respect to the desired dynamics module 322, the desired dynamics module 322 can apply integral compensation using various gains (e.g., feedforward gain, feedback gain, bandwidth gain, command gain, integral gain, or a combination thereof).

Accordingly, embodiments described herein provide a multi-input, multi-output control logic and architecture that, using first principle modeling, simultaneously obtains main rotor assembly thrust and pusher-propeller thrust by inverting path dynamics equations. This simultaneous control provides tight altitude and airspeed response, such as for NOE flight, contour flight, and low level flight, by recognizing the coupling between airspeed (velocity) and climb-rate (flight path angle). In other words, simultaneously controlling airspeed and flight path angle via the above dynamic inversion equations by making use of both the pusher-propeller and the main rotor represents a novel control algorithm for an aircraft as compared traditional approaches where the main rotor and the pusher-propeller separately control altitude and speed, respectively.

Various features and advantages are set forth in the following claims.

What is claimed is:

1. A system for controlling an aircraft including a co-axial main rotor assembly and a pusher-propeller, the system comprising:
an electronic controller configured to:
receive a reference velocity of the aircraft;
receive a reference flight path angle of the aircraft; and
simultaneously control the co-axial main rotor assembly and the pusher-propeller based on the reference velocity of the aircraft and the reference flight path angle of the aircraft, by simultaneously generating a commanded thrust of the pusher-propeller and a commanded thrust of the co-axial main rotor assembly using a multiple input, multiple output algorithm applying dynamic inversion, wherein the dynamic inversion outputs the commanded thrust of the pusher-propeller and the commanded thrust of the co-axial main rotor.

2. The system of claim 1, wherein the electronic controller is configured to simultaneously control the co-axial main rotor assembly and the pusher-propeller by:
applying a reference model to the reference velocity and the reference flight path angle to generate a commanded velocity of the aircraft and a commanded flight path angle of the aircraft.

3. The system of claim 2, wherein applying the reference model to the reference velocity and the reference flight path angle includes applying the reference model based on a hedge signal.

4. The system of claim 3, wherein the hedge signal includes a hedge signal for velocity and a hedge signal for flight path angle.

5. The system of claim 3, wherein the hedge signal is generated based on a thrust of the co-axial main rotor assembly and a thrust of the pusher-propeller.

6. The system of claim 5, wherein at least one of the thrust of the co-axial main rotor assembly and the thrust of the pusher-propeller is generated via a look-up table.

7. The system of claim 2, wherein the electronic controller is configured to simultaneously generate the commanded thrust of the pusher-propeller and the commanded thrust of the co-axial main rotor assembly by:
applying desired dynamics to the commanded velocity of the aircraft and the commanded flight path angle of the aircraft to generate a rate of change of a desired velocity of the aircraft and a rate of change of a desired flight path angle of the aircraft.

8. The system of claim 7, wherein the electronic controller is configured to apply the desired dynamics to the commanded velocity of the aircraft and the commanded flight path angle of the aircraft by applying the desired dynamics to the commanded velocity of the aircraft and the commanded flight path angle of the aircraft with integral compensation.

9. The system of claim 7, wherein the electronic controller is configured to simultaneously generate the commanded thrust of the pusher-propeller and the commanded thrust of the co-axial main rotor assembly by:
applying dynamic inversion to the rate of change of the desired velocity of the aircraft and the rate of change of the desired flight path angle of the aircraft to generate the commanded thrust of pusher-propeller and the commanded thrust of the co-axial main rotor assembly.

10. A method of controlling an aircraft including a co-axial main rotor assembly and a pusher-propeller, the method comprising:
receiving, with an electronic controller, a reference velocity of the aircraft;
receiving, with the electronic controller, a reference flight path angle of the aircraft; and
simultaneously controlling, with the electronic controller, the co-axial main rotor assembly and the pusher-propeller based on the reference velocity of the aircraft and the reference flight path angle of the aircraft by simultaneously generating a commanded thrust of the pusher-propeller and a commanded thrust of the co-axial main rotor assembly using a multiple input, multiple output algorithm applying dynamic inversion, wherein the dynamic inversion outputs the commanded thrust of the pusher-propeller and the commanded thrust of the co-axial main rotor.

11. The method of claim 10, wherein simultaneously generating the commanded thrust of the pusher-propeller and the commanded thrust of the co-axial main rotor assembly includes:
applying a reference model to the reference velocity and the reference flight path angle to generate a commanded velocity of the aircraft and a commanded flight path angle of the aircraft.

12. The method of claim 11, wherein applying the reference model to the reference velocity and the reference flight path angle includes applying the reference model based on a hedge signal.

13. The method of claim 12, further comprising generating the hedge signal based on a thrust of the co-axial main rotor assembly and a thrust of the pusher-propeller.

14. The method of claim 11, wherein simultaneously generating the commanded thrust of the pusher-propeller and the commanded thrust of the co-axial main rotor assembly includes:
applying desired dynamics to the commanded velocity of the aircraft and the commanded flight path angle of the aircraft to generate a rate of change of a desired velocity of the aircraft and a rate of change of a desired flight path angle of the aircraft.

15. The method of claim 14, wherein applying the desired dynamics to the commanded velocity of the aircraft and the commanded flight path angle of the aircraft includes applying the desired dynamics to the commanded velocity of the aircraft and the commanded flight path angle of the aircraft with integral compensation.

16. The method of claim 14, wherein simultaneously generating the commanded thrust of the pusher-propeller and the commanded thrust of the co-axial main rotor assembly includes:
applying dynamic inversion to the rate of change of the desired velocity of the aircraft and the rate of change of the desired flight path angle of the aircraft to generate the commanded thrust of pusher-propeller and the commanded thrust of the co-axial main rotor assembly.

17. A non-transitory computer readable medium storing instructions, executable by an electronic processor, to perform a set of functions, the set of functions comprising:
simultaneously controlling a co-axial main rotor assembly and a pusher-propeller of an aircraft based on a reference velocity of the aircraft and a reference flight path angle of the aircraft using a multiple input, multiple output algorithm applying dynamic inversion, wherein the dynamic inversion outputs the commanded thrust of the pusher-propeller and the commanded thrust of the co-axial main rotor.

18. The non-transitory computer readable medium of claim 17, wherein simultaneously controlling the co-axial main rotor assembly and the pusher-propeller includes:
applying a reference model to the reference velocity and the reference flight path angle to generate a commanded velocity of the aircraft and a commanded flight path angle of the aircraft.

19. The non-transitory computer readable medium of claim 18, wherein simultaneously controlling the co-axial main rotor assembly and the pusher-propeller includes:
applying desired dynamics to the commanded velocity of the aircraft and the commanded flight path angle of the aircraft to generate a rate of change of a desired velocity of the aircraft and a rate of change of a desired flight path angle of the aircraft.

20. The non-transitory computer readable medium of claim 19, wherein simultaneously controlling the co-axial main rotor assembly and the pusher-propeller includes:
applying dynamic inversion to the rate of change of the desired velocity of the aircraft and the rate of change of the desired flight path angle of the aircraft to generate a commanded thrust of pusher-propeller and a commanded thrust of the co-axial main rotor assembly.

* * * * *